US005506934A

United States Patent [19]

Kawama

[11] Patent Number: 5,506,934

[45] Date of Patent: Apr. 9, 1996

[54] POST-FILTER FOR SPEECH SYNTHESIZING APPARATUS

[75] Inventor: Shuichi Kawama, Kyoto, Japan

[73] Assignee: Sharp Kabushiki Kaisha, Osaka, Japan

[21] Appl. No.: 253,990

[22] Filed: Jun. 3, 1994

Related U.S. Application Data

[63] Continuation of Ser. No. 906,312, Jun. 26, 1992, abandoned.

[30] Foreign Application Priority Data

Jun. 28, 1991 [JP] Japan .................................. 3-158670

[51] Int. Cl.[6] .................................................. G01L 9/00

[52] U.S. Cl. ........................................... 395/267; 395/2.7

[58] Field of Search ........................... 381/29–40, 51–53; 395/2.1–2.39, 2.67–2.78

[56] References Cited

U.S. PATENT DOCUMENTS 4,726,037 2/1988 Jayant ....................................... 381/30
4,969,192 11/1990 Chen et al. ............................... 381/31
5,016,279 5/1992 Kawama et al. .......................... 381/36

OTHER PUBLICATIONS

Ira A. Gerson and Mark A. Jasuik, "Vector Sum Excited Linear Prediction (VSELP) Speech Coding at 8 KBPS", Proc. IEEE Int. Conf. ASSP, pp. 461–464 Apr. 1990.

*Primary Examiner*—Allen R. MacDonald
*Assistant Examiner*—Michelle Doerrler
*Attorney, Agent, or Firm*—David G. Conlin; George W. Neuner

[57] ABSTRACT

A post-filter adapted to be used for a speech synthesizing apparatus includes a filtering unit for filtering a synthesized signal, and a scaling coefficient in accordance with both the synthesized signal and a signal output from the filtering unit. The post filter also includes an amplitude detecting unit for detecting an amplitude of the signal output from the filtering unit and for adjusting a value of the scaling coefficient in accordance with a detected result so that an amplitude of the signal output from the filtering unit is kept within a predetermined amplitude value. The post filter further includes a multiplier for calculating the filtering unit with the adjusted scaling coefficient.

9 Claims, 4 Drawing Sheets

AMPLITUDE
n n n

BORDER OF SUBFRAME (FRAME)

1
S(n)
S'
n
n = 0

POST-FILTER FOR SPEECH SYNTHESIZING APPARATUS

This is a continuation of application Ser. No. 07/906,312 filed on Jun. 26, 1992 now abandoned.

BACKGROUND OF THE INVENTION

1. Field of the Invention

The present invention relates to a speech synthesizing apparatus, more particularly to a post-filter for the speech synthesizing apparatus which is capable of reproducing any sound except voice without deterioration.

2. Description of the Related Art

The inventors of the present invention know that a speech synthesizing apparatus for reproducing a compressed or coded speech which utilizes a post-filter for enhancing a quality of the synthesized speech. This post-filter realizes a function of shaping noises by using an audio masking characteristic of a human being. The post-filter is normally used for the speech synthesizing apparatus which utilizes a coding method such as a code-excited linear prediction (referred to as a CELP).

The noise shaping indicates a function of processing a spectrum form of an error signal caused between a synthesized speech and an original speech to be likewise to the spectrum form of the original speech, expanding an energy difference between an original speech and a noise in a valley of the spectrum, and suppressing the acoustically sensing range of the noise by the masking characteristic.

The post-filter is normally located immediately after a decoder provided in the speech synthesizing apparatus.

In general, the post-filter has a transfer function H(z) represented by the following expression $$H(z)=P'(z)/P''$$

wherein 1/P(z) is a transfer function of a spectrum envelope synthesizing filter used in a decoder. The denominator P(z) is a short-period filter, a spectrum envelope prediction filter or a reverse filter (herein, referred to as a reverse filter). The denominator P(z) may be represented by the following expression.

$$P(z)=1-\Sigma\alpha_i z^{-i}$$

wherein $\alpha_i$ is an i-degree linear prediction coefficient with i being a positive integer (if p is a positive integer, the prediction degree may be represented by p). Both of P'(z) and P"(z) have an expanded band of a peak (formant) of the spectrum of the reverse filter P(z). P'(z) has a more expanded band than P"(z).

The filter serves to intensify the formant of the synthesized speech output from the decoder. Hence, the energy is condensed at the formant of the error spectrum against the spectrum of the original speech so that the form of the error spectrum may come closer to the form of the spectrum of the original speech.

In general, P'(z) and P"(z) are represented by the following expressions, respectively.

$$P'(z)=P(z/\eta)=1-\Sigma\alpha_i\eta^i z^{-i}$$

$$P''(z)=P(z/v)=1-\Sigma\alpha_i v^i z^{-i}\ (0<\eta<v<1)$$

These relational expressions are described in J. H. Chain, A. Gersho, "Real-Time Vector APE Speech Coding at 48800 bps with Adaptive Postfilter", Proc. IEEE Int. Conf. on Acoustics, Speech and Signal Processing, pp. 51.3.31–51.3.4, April, 1987.

The decoding method implemented in the speech synthesizing apparatus having the post-filter is arranged to receive a linear prediction coefficient at every certain time (normally referred to as a frame), in some cases, interpolate the linear prediction coefficient received at each of the divided frames (which is referred to as subframes), and synthesize the speech by using the interpolated linear prediction coefficient.

The factor of the post-filter is derived from the interpolated linear prediction coefficient and the gain of the post-filter changes depending on the linear prediction coefficient.

The foregoing post-filter includes an automatic gain control function for returning the energy of the synthesized speech amplified or attenuated by the gain into the energy of the synthesized speech before it is passed through the post-filter. The automatic gain control function will be referred to as an AGC function.

In turn, the description will be directed to a method of implementing the AGC function. This method is described in I. A. Gerson, M. A. Jaisuk, "Vector Sum Excited Linear Prediction (VSELP) Speech Coding at 8 kbps", Proc. IEEE Int. Conf. on Acoustics, Speech and Signal Processing, pp. 461–464, April, 1990.

This method is arranged to take the steps of deriving a scaling factor S and multiplying the signal immediately after the post-filter by the scaling factor S for obtaining the energy before and after the post-filter in the subframe or the frame. Then, the step is taken of obtaining a ratio of a square of the energy before the post-filter to that of the energy after the post-filter in the subframe (frame) as a temporary scaling factor S'.

In case that the temporary scaling factor S' is directly used in the AGC, the factor S' may be greatly variable according to each subframe (frame). Hence, the synthesized speech becomes discontinuous on the border of the adjacent subframes (frames). The discontinuity brings about the noise at the cut portion of the synthesized speech. To avoid this shortcoming, the temporary scaling factor S' is passed through a primary low-pass filter as gradually changing its scaling filter. This relation will be represented by the following expression.

$$S(n)=\zeta S(n)+(1-\zeta)S',\ 0<\zeta<1,\ n=0, 1, \ldots, N-1$$

wherein n (positive integer) represents a sampling time point within a subframe (frame), N (positive integer) represents the number of samples within a subframe (frame), and S(−1) on the right side is S(N−1) of the previous subframe (previous frame) when S(0) is obtained. To suppress abrupt variation of the scaling factor S(n), the constant ζ may normally take 1 or a value closer to 1.

In various kinds of telephone services, when the phone is pending, a melody sounds onto the phone line or when dialing the phone, a dual tone multi-frequency signal (referred to as a DTMF) is used. In case that a phone includes a speech synthesizing apparatus implemented according to the method for coding the VSELP and provided with an AGC-function-attached post-filter on the reproducing side, the tone signal such as a melody is reproduced together with a speech.

The foregoing speech synthesizing apparatus, however, may provide greatly variable linear prediction coefficients on a change point of a tone or a leading edge after the silence, resulting in greatly changing the gain of the post-filter. In such a case, the post-filter may increase the amplitude of the tone signal from the start point of the subframe (frame), when the temporary scaling factor S' is far smaller than that at the previous subframe (frame). When the actual scaling factor S(n) has a small value of n, however, the scaling factor S(n) has a greatly different value from the temporary scaling factor S'. Hence, the scaling factor S(n) is not endurable to suppressing the increased amplitude of the tone signal.

The above-described shortcoming will be more concretely described with reference to FIGS. 1*a* to 1*d*.

FIG. 1*a* shows a synthesized tone signal immediately before it passes through the post-filter of the speech synthesizing apparatus. FIGS. 1*b* and 1*c* are a synthesized tone signal immediately after it passes through the post-filter, in which the wave of FIG. 1*b* corresponds to the wave before through the effect of the AGC and the wave of FIG. 1*c* corresponds to the wave after through the effect of the AGC. FIG. 1*d* shows the scaling factor S(n) and the temporary scaling factor S' of the AGC in FIG. 1*c*. When the post-filter serves to abruptly increase the amplitude of the synthesized tone signal as shown in FIG. 1*b* as compared to that shown in FIG. 1*a*, as shown in FIG. 1*d*, the temporary scaling factor S' is greatly different from the scaling factor S(0) at the starting point n=0 of the subframe or the frame so that the scaling factor S(n) needs a considerably long time to come closer to the temporary scaling factor S'. The AGC, therefore, cannot suppress the increased amplitude as shown in FIG. 1*b*, resulting in making the amplitude greatly changed as shown in FIG. 1*c*.

The increased amplitude of the synthesized signal may exceed the range in which the amplitude value can be D/A converted. When it exceeds the range, a large sound "pop" appears. Further, if it stays in the range, the waveform of the synthesized signal is greatly different from that of the original sound, resulting in making the quality of the synthesized signal inferior.

SUMMARY OF THE INVENTION

It is an object of the present invention to provide a post-filter for a speech synthesizing apparatus which is capable of preventing a quality of the synthesized signal from being deteriorated.

The object of the present invention can be achieved by a post-filter adapted to be used for a speech synthesizing apparatus, includes a unit for filtering a synthesized signal, a unit for calculating a scaling factor in accordance with both the synthesized signal and a signal output from the filtering unit, a unit for detecting an amplitude of the signal output from the filtering unit and for adjusting a value of the scaling factor in accordance with a detected result so that an amplitude of the signal output from the filtering unit is kept within a predetermined amplitude value, and a unit for calculating a product by multiplying the signal output from the filtering unit with the adjusted scaling factor.

Preferably, the filtering unit includes a transfer function by which a spectrum peak of an input signal is intensified.

More preferably, the scaling factor calculating unit is adapted to calculate an energy of the signal output from the filtering unit and an energy of the signal before the filtering unit so as to derive a scaling factor based on a compared result.

The scaling factor calculating unit may calculate a scaling factor on which an energy of a signal amplified or attenuated in the filtering unit is made substantially equal to an energy of an signal before the filtering unit.

The scaling factor calculating unit preferably serves to change a variable ζ of a low-pass filter according to a detected result of the amplitude detector and to multiply a temporary scaling factor S' for deriving an actual scaling factor S(n), the actual factor S(n) being expressed by $$S(n)=\zeta S(n)+(1-\zeta)S',\ 0<z<1,\ n=0,\ 1,\ \ldots,\ N-1$$

and being sent to the multiplier at each sampling time point n where n being a positive integer.

The detecting unit is an amplitude detecting unit which is adapted to detect the amplitude of the signal output from the filtering unit through an effect of an automatic gain control function, preferably.

The amplitude detector may be arranged to control a speed of a scaling factor changing at each sampling time point n so that an increase of an amplitude of the signal output from the filtering unit may be suppressed even if the increase is not allowed to be suppressed through the effect of a normal automatic gain control.

The amplitude detector further serves to detect if an increased amplitude of the signal output from the filtering unit is allowed to be suppressed through the effect of the normal automatic gain control when a leading edge of a tone signal is reproduced, preferably.

The product calculating unit is preferably a multiplier which is adapted to multiply the signal output from the filtering unit by the scaling factor output from the scaling factor calculating unit.

The post-filter further includes a factor calculating unit which uses a linear prediction coefficient through which the filtering factor of the filtering unit is derived, preferably.

Preferably, the filtering factor is updated at a subframe or frame unit.

In operation, the filtering unit serves to filter the synthesized signal. Then, the factor calculating unit serves to derive the scaling factor based on an output signal of the filtering unit and the synthesized signal sent from the speech synthesizing apparatus. The amplitude detecting unit serves to detect the amplitude of the output signal and adjust the scaling factor on the sensed result so that the amplitude of the output signal may not exceed a predetermined amplitude. Then, the multiplying unit serves to multiply the output signal by the adjusted scaling factor.

Further objects and advantages of the present invention will be apparent from the following description of the preferred embodiment of the invention as illustrated in the accompanying drawings.

DESCRIPTION OF THE PREFERRED EMBODIMENT

The description will be directed to a post-filter for a speech synthesizing apparatus according to an embodiment of the present invention.

Figures 1A, 1B, 1C, 1D:
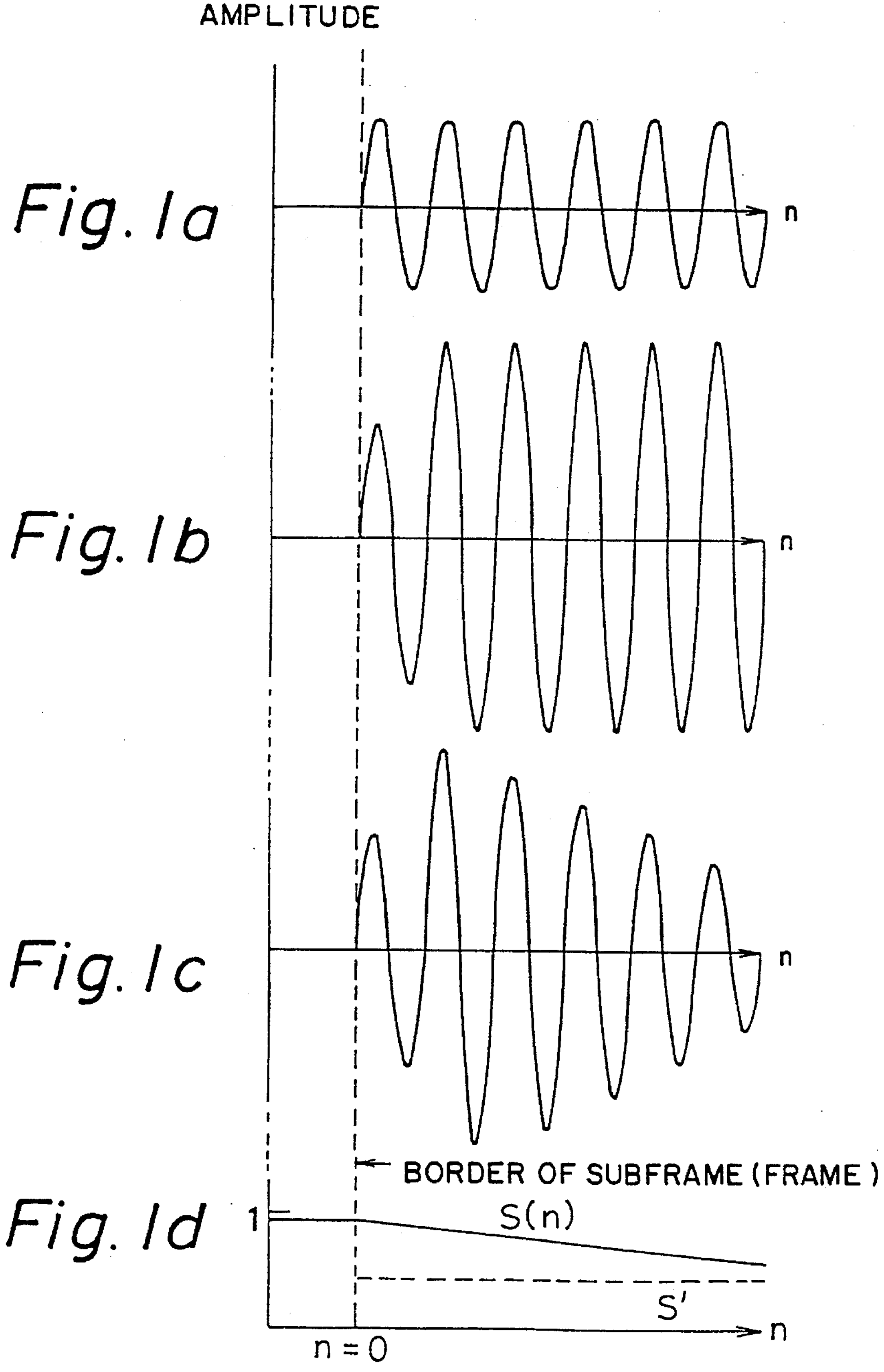
FIG. 1*a* to FIG. 1*d* illustrates a chart showing a relation between an amplitude increased by a normal AGC function of a post-filter and a scaling factor S.
Figure 2:
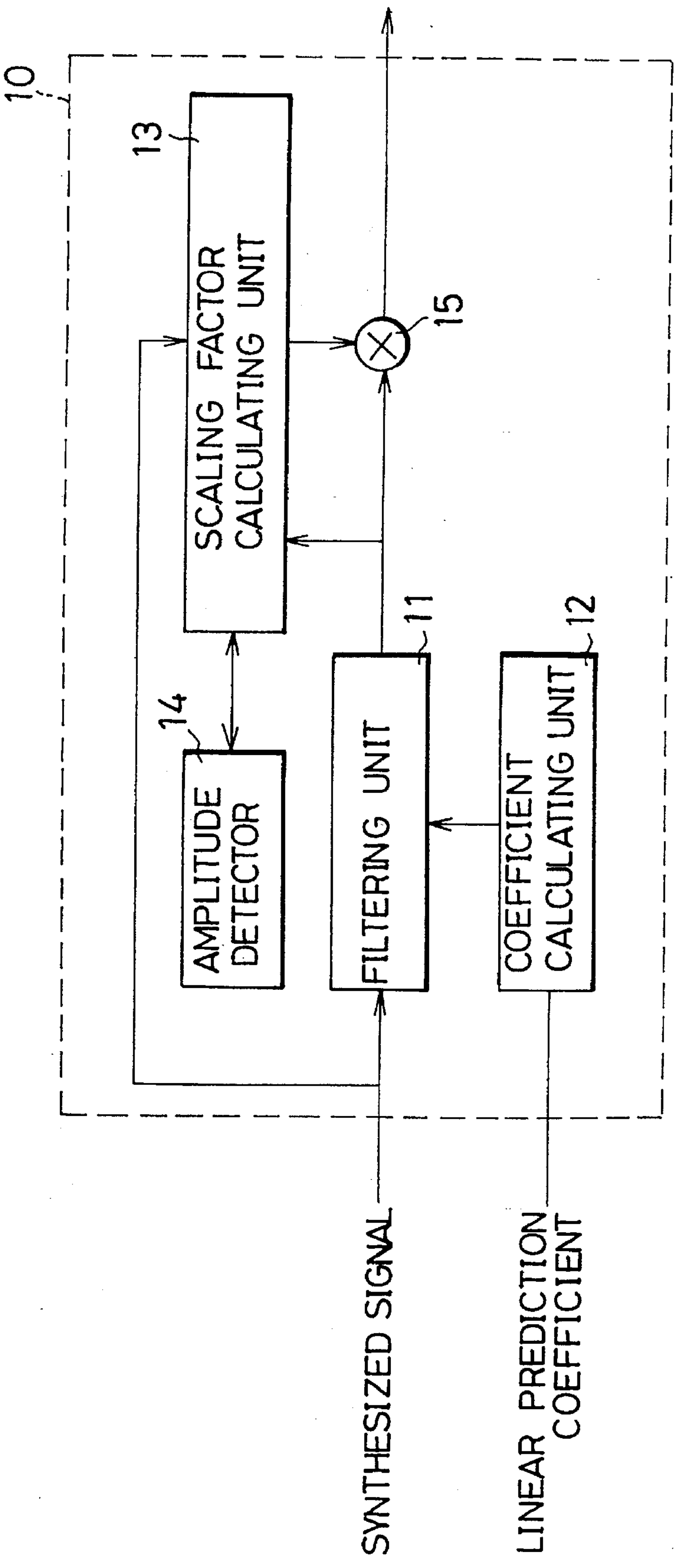
FIG. 2 is a block diagram showing a post-filter for speech synthesizing according to an embodiment of the present invention.
Figure 3:
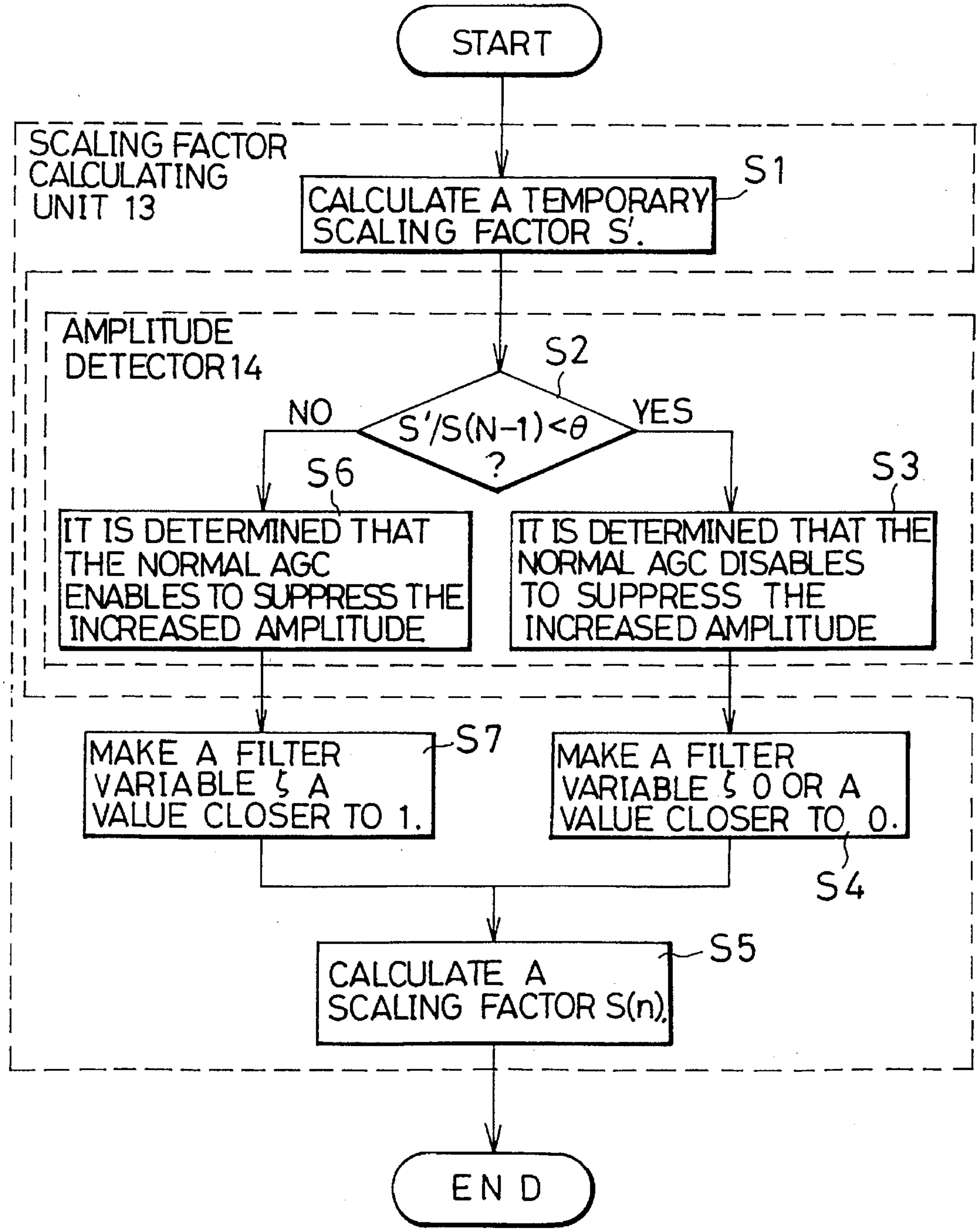
FIG. 3 is a flowchart showing an operation of the post-filter shown in FIGS. 1*a*–1*d*.

FIG. 2 shows a post-filter for a speech synthesizing apparatus according to the embodiment.

As shown in FIG. 2, the post-filter 10 includes a filtering unit 11, a coefficient calculating unit 12, a scaling factor calculating unit 13, an amplitude detector 14, and a multiplier 15.

The filtering unit 11 operates to filter a synthesized signal.

The factor calculating unit 12 calculates a coefficient of the filtering unit 11.

The scaling factor calculating unit 18 calculates the energy of the output of the filtering unit 11 and the energy of the signal before the filtering unit 11 for deriving a scaling factor (referred to as a scaling factor) based on the compared result.

The amplitude detector 14 serves to detect the amplitude of the output signal of the filtering unit 11 through the effect of the AGC.

The multiplier 15 multiplies the output signal of the filtering unit 11 by the scaling factor sent from the scaling factor calculating unit 13.

The function of the AGC is implemented by the scaling factor calculating unit 13, the amplitude detector 14 and the multiplier 15.

Each of those components will be described in detail.

The filtering unit 11 includes a transfer function by which the spectrum peak of the input signal is intensified.

The factor calculating unit 12 uses a linear prediction coefficient through which the filtering factor of the filtering unit 11 is derived. The filtering factor is updated at a subframe or frame unit.

The scaling factor calculating unit 13 calculates a scaling factor on which the energy of the signal amplified or attenuated in the filtering unit 11 is made substantially equal to the energy of the signal before the filtering unit 11.

The amplitude detector 14 is arranged to control the speed of the scaling factor changing at each sampling time point n so that the increase of the amplitude of the output signal of the filtering unit 11 may be suppressed even if the increase is not allowed to be suppressed through the effect of the normal AGC. The amplitude detector 14 serves to detect if the increased amplitude of the output signal of the filtering unit 11 is allowed to be suppressed through the effect of the normal AGC when the leading edge of a tone signal is reproduced, for example.

The scaling factor calculating unit 13 serves to change a variable $\zeta$ of a low-pass filter according to the detected result of the amplitude detector 14 and multiply the temporary scaling factor S' by the first-order low-pass filter (not shown) for deriving an actual scaling factor S(n). Concretely, the following expression is used for deriving the factor S(n).

$$S(n)=\zeta S(n)+(1-\zeta)S',\ 0<z<1,\ n=0,\ 1,\ \ldots,\ N-1$$

The scaling factor S(n) is sent to the multiplier 15 at each sampling time point n (positive integer).

In turn, the description will be directed to the operation of the post-filter for the speech synthesizing, in particular, the operation of deriving the scaling factor.

At the start of the subframe (frame), the energy (a root sum square of an amplitude within the subframe (frame) of each signal) is obtained within the subframe (frame) of an I/O signal of the filtering unit 11. The operation is executed to calculate a root of "energy of an input signal"/"energy of an output signal" for obtaining a temporary scaling factor S' (step 1). When the scaling factor calculating unit 13 obtains the temporary scaling factor S', the operation is executed to calculate a ratio "S'/S(N−1)" of the temporary scaling factor S' to the scaling factor S(N−1) at the end of the previous subframe (frame) and determine whether or not the ratio "S'/S(N−1) and a threshold value θ meet the relation "S'/S(N−1)"<θ (step 2). If yes at the step 2, it is determined that the normal AGC disables to sufficiently suppress the increased amplitude if any (step S3). That is, when the temporary scaling factor S' is slightly smaller than the scaling factor S(N−1) at the end of the previous subframe (frame), it takes a considerably long time make the scaling factor S(n) closer to the temporary scaling factor S' in the low-pass filter of the scaling factor with a variable $\zeta$ being closer to 1. Hence, at the first half of the subframe (frame), it is considered that the increased amplitude cannot be suppressed by the larger value of S(n) than S'. That is, if it is determined that the increased amplitude of the output signal is not allowed to be suppressed according to the detected result of the amplitude detector 14, the variable $\zeta$ is set to 0 or a value closer to 0 (step S4). Then, with the variable set as above, the scaling factor S(n) is calculated (step S5). When n=0 or n is a small value, the scaling factor S(n) becomes the temporary scaling factor S' so that the AGC may suppress the increased amplitude.

If No at the step S3, it is determined that the increased amplitude of the output signal of the filtering unit 11 can be suppressed through the effect of the AGC (step S6). The variable z is set to a value closer to 1 (step S7) and the scaling factor S(n) is calculated with the variable $\zeta$ as described at the step S5. Hence, by abruptly changing the scaling factor S(n), the discontinuity of the signal processed by the AGC may disappear on the border of the adjacent subframes (frames).

Noises may result from the discontinuity of the AGC-processed signal on the border of the adjacent subframes (frames). The noises are negligible as compared with noises generated by exceeding the amplitude of the signal over a D/A-convertible range, when the signal whose amplitude is not suppressed is converted from a digital signal to an analog signal in a digital-to-analog converter (not shown) located after the post-filter. Hence, the former noises give far smaller acoustic degradation to the signal than the latter noises.

As an alternative method, the amplitude detector 14 serves to compare the amplitude of the AGC-processed signal with that of the signal before the filtering unit 11 so as to determine whether or not the amplitude is completely suppressed through the effect of the AGC.

Figure 4:
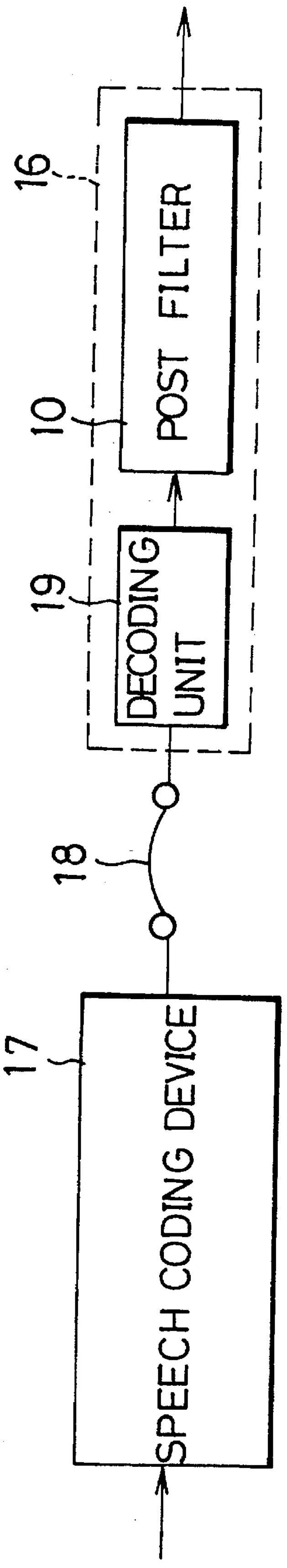
FIG. 4 is a block diagram showing a speech synthesizing apparatus provided with the post-filter shown in FIGS. 1*a*–1*d* and a speech coding device for creating a signal input to the speech coding device.

FIG. 4 shows a speech synthesizing apparatus 16 provided with the post-filter 10 and a speech coding device 17 for creating an input signal for the speech synthesizing apparatus 16.

The speech coding device 17 serves to code a speech and another signal. As a coding method, a CELP system coding method may be executed by using the linear prediction coefficient. That is, the linear prediction coefficient is obtained at each frame unit so that parameters such as the linear prediction coefficient (reflection coefficient) may be coded with the other information.

The codes created by the speed coding device 17 are sent to the speech synthesizing apparatus 18 through a channel 18. Herein, the channel 18 means a radio or wire system transmission path or a storage device for temporarily storing the codes.

The speech synthesizing apparatus 16 includes the decoding unit 19 and the post-filter 10 as described above. The decoding unit 19 decodes the coded signal sent through the channel 18 so as to obtain the linear prediction coefficient and the other information, on which the signal such as a speech is synthesized.

The post-filter 10 serves to improve the quality of the synthesized signal and send the improved signal to the outside. The post-filter 10 receives the liner prediction coefficient at the start of each frame or the subframe. In addition, in the case of the subframe, the linear prediction coefficient has been already interpolated.

Many widely different embodiments of the present invention nay be constructed without departing from the spirit and scope of the present invention. It should be understood that the present invention is not limited to the specific embodiments described in the specification, except as defined in the appended claims.

What is claimed is:

1. A post-filter adapted to be used for a speech synthesizing apparatus comprising:

a filtering means for filtering an inputted synthesized signal;

a detecting means for detecting a change amount of an amplitude of the filtered signal in which said filtered signal is scaled by a normal automatic gain control function, and for determining whether said change amount is greater than a predetermined value or less;

a calculating means for calculating a scaling coefficient at respective sampling time points based on both of said inputted synthesized signal before said filtering means and said filtered synthesized signal after said filtering means; and a multiplying means for multiplying said filtered synthesized signal and said calculated scaling coefficient, said calculating means being adapted to vary, rapidly, said scaling coefficient in a case where said detecting means determines that said change amount is greater than said predetermined value, and adapted not to vary, rapidly, said scaling coefficient in a case where said detecting means determines that said change amount is less than said predetermined value.

2. A post-filter according to claim 1, wherein said calculating means is adapted to calculate an energy of said filtered synthesized signal after said filtering means and an energy of said inputted synthesized signal before said filtering means so as to derive said scaling coefficient based on a determination of said change amount by said detecting means.

3. A post-filter according to claim 2, wherein said calculating means is adapted to calculate said scaling coefficient on which an energy of said filtered synthesized signal after said filtering means is made substantially equal to an energy of said inputted synthesized signal before said filtering means.

4. A post filter according to claim 3, wherein said calculating means serves to change a variable ζ of a low-pass filter according to said detected result of said detecting means and to multiply a temporary scaling coefficient S' for deriving an actual scaling coefficient S(n), said actual scaling coefficient S(n) being expressed by $$S(n)=\zeta S(n)+(1-\zeta)S',\ 0\leqq\zeta\leqq 1,\ n=0,\ 1,\ \ldots,\ N-1$$

and being sent to said multiplying means at respective sampling time points n where n is a positive integer, said variable ζ being set to 0 or a value closer to 0 if the normal automatic gain control ("AGC") disables to suppress an increased amplitude of an output signal according to said detected result of said detecting means, said variable ζ being set to a value closer to 1 if the normal AGC enables to suppress said increased amplitude of said output signal according to said detected result of said detecting means.

5. A post-filter according to claim 1, wherein said detecting means further serves to detect if an increased amplitude of said filtered synthesized signal after said filtering unit is allowed to be suppressed through an effect of said normal automatic gain control when a leading edge of said inputted synthesized signal is reproduced.

6. A post-filter according to claim 1, wherein said multiplying means comprises a multiplier which is adapted to multiply said filtered synthesized signal after said filtering means by said scaling coefficient output from said calculating means.

7. A post-filter according to claim 1, wherein said post-filter further comprises a coefficient calculating unit which uses a linear prediction coefficient through which a filtering coefficient of said filtering means is derived.

8. A post-filter according to claim 1, wherein said filtering coefficient is updated at a subframe unit or frame unit.

9. A post-filter according to claim 1, wherein said filtering means has a transfer function by which a spectrum peak of said inputted synthesized signals is intensified.

* * * * *